United States Patent
Takenouchi et al.

(10) Patent No.: US 11,618,698 B2
(45) Date of Patent: Apr. 4, 2023

(54) WASTE FLUID TREATMENT APPARATUS AND PROCESSING WATER REGENERATION SYSTEM

(71) Applicant: DISCO CORPORATION, Tokyo (JP)

(72) Inventors: Kenji Takenouchi, Tokyo (JP); Hiroyuki Kashiwagi, Tokyo (JP); Jun Suwano, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 211 days.

(21) Appl. No.: 17/116,352

(22) Filed: Dec. 9, 2020

(65) Prior Publication Data
US 2021/0188670 A1    Jun. 24, 2021

(30) Foreign Application Priority Data
Dec. 19, 2019 (JP) .............................. JP2019-229083

(51) Int. Cl.
*C02F 1/66* (2023.01)
*C02F 1/68* (2023.01)
(Continued)

(52) U.S. Cl.
CPC ............ *C02F 1/66* (2013.01); *B01D 21/0045* (2013.01); *C02F 1/32* (2013.01); *C02F 1/42* (2013.01);
(Continued)

(58) Field of Classification Search
CPC ...... C02F 1/66; C02F 1/32; C02F 1/42; C02F 1/68; C02F 2001/007; C02F 2103/346;
(Continued)

(56) References Cited

U.S. PATENT DOCUMENTS 3,399,133 A * 8/1968 Gerdes ............... G01N 15/0656
                                                     73/61.41
4,253,965 A * 3/1981 Pielkenrood ....... B01D 21/2444
                                                     210/519
(Continued)

FOREIGN PATENT DOCUMENTS

JP   2004230527 A   8/2004
JP   2009095941 A   5/2009

OTHER PUBLICATIONS

Office Action issued in counterpart Singapore patent application No. 10202011909P, dated Nov. 15, 2021.

*Primary Examiner* — Joseph W Drodge
(74) *Attorney, Agent, or Firm* — Greer Burns & Crain, Ltd.

(57) ABSTRACT

A waste fluid treatment apparatus includes a sedimentation tank that stores the processing waste fluid with the processing debris contained therein, an inflow port provided on the sedimentation tank for introduction of the processing waste fluid into the sedimentation tank, an acidification unit configured to acidify the processing waste fluid to be introduced from the inflow port into the sedimentation tank, whereby the processing debris is allowed to settle at a higher rate compared with a rate at which the processing debris would settle if the processing waste water is neutral, and an outflow port provided on the sedimentation tank for discharge of acidic supernatant that is obtained by allowing the processing debris in the processing waste fluid to settle in the sedimentation tank from the sedimentation tank.

12 Claims, 4 Drawing Sheets

(51) Int. Cl.
  *C02F 1/32* (2023.01)
  *C02F 1/42* (2023.01)
  *B01D 21/00* (2006.01)
  *C02F 103/34* (2006.01)
  *C02F 1/00* (2023.01)

(52) U.S. Cl.
  CPC .......... *C02F 1/68* (2013.01); *C02F 2001/007* (2013.01); *C02F 2103/346* (2013.01); *C02F 2209/06* (2013.01)

(58) Field of Classification Search
  CPC ........ C02F 2209/06; C02F 9/00; C02F 1/444; C02F 2209/03; C02F 1/52; C02F 1/008; C02F 2209/00; B01D 21/00; B01D 21/02; B01D 21/24; B01D 21/2444; B01D 21/30; B01D 21/302; B01D 21/0042; B01D 21/0045; B01D 21/0087; B24B 57/00; B24B 57/02; B24B 57/04
  USPC .................................. 451/60, 446
  See application file for complete search history.

(56) References Cited

U.S. PATENT DOCUMENTS

| | | | | |
|---|---|---|---|---|
| 6,428,709 | B1* | 8/2002 | Tsuihiji | B01D 29/70 |
| | | | | 210/791 |
| 11,174,179 | B2* | 11/2021 | Yoshida | C02F 1/56 |
| 11,390,536 | B2* | 7/2022 | Matsumoto | C02F 1/006 |
| 2002/0006769 | A1* | 1/2002 | Tsuihiji | B01D 69/14 |
| | | | | 451/87 |
| 2002/0139736 | A1* | 10/2002 | Stever | B01D 17/0211 |
| | | | | 210/170.03 |
| 2008/0250723 | A1* | 10/2008 | Fragiacomo | B01D 21/009 |
| | | | | 494/36 |
| 2009/0206016 | A1* | 8/2009 | Furonaka | C02F 9/005 |
| | | | | 210/96.1 |
| 2009/0236292 | A1 | 9/2009 | Kosaka | |
| 2011/0042291 | A1* | 2/2011 | Yoshida | C02F 9/005 |
| | | | | 210/202 |
| 2013/0213895 | A1* | 8/2013 | Criswell | C02F 1/24 |
| | | | | 210/709 |
| 2013/0291444 | A1 | 11/2013 | Matsuo et al. | |
| 2020/0102233 | A1* | 4/2020 | White | C02F 9/00 |

* cited by examiner

WASTE FLUID TREATMENT APPARATUS AND PROCESSING WATER REGENERATION SYSTEM

BACKGROUND OF THE INVENTION

Field of the Invention

The present invention relates to a waste water treatment apparatus for removing processing debris from processing waste fluid, and also to a processing water regeneration system for regenerating processing water.

Description of the Related Art

When workpieces are processed by a grinding stone of a processing machine while processing water is supplied, processing waste fluid is discharged from the processing machine with the processing debris contained therein. In the processing water circulation apparatus disclosed in Japanese Patent Laid-Open No. 2004-230527, for example, processing water is regenerated by allowing processing debris to settle out from such processing waste fluid. However, it takes time to allow small pieces of processing debris of 0.5 μm to 5 μm in size to settle in a sedimentation tank, thereby posing a problem that a sedimentation tank of large capacity is needed. In the processing waste fluid treatment apparatus disclosed in Japanese Patent Laid-Open No. 2009-095941, for example, downsizing of the apparatus is therefore realized by adopting a configuration that removes processing debris contained in processing waste fluid by filtration with a filter.

SUMMARY OF THE INVENTION

With the processing waste fluid treatment apparatus disclosed in Japanese Patent Laid-Open No. 2009-095941, however, periodic replacement of the filter is needed. If a lot of processing debris is contained in processing waste fluid discharged from a processing machine, the frequency of filter replacement thus becomes higher so that a greater load is imposed on workers.

The present invention hence has, as objects thereof, a reduction in load of the workers associated with a filter replacement and the like and also downsizing of a sedimentation tank in a waste fluid treatment apparatus for removing processing debris from processing waste fluid and a processing water regeneration system in which the waste fluid treatment apparatus is incorporated to regenerate processing water.

In accordance with an aspect of the present invention, there is provided a waste fluid treatment apparatus for receiving processing waste fluid discharged from a processing machine that processes a workpiece with processing water supplied thereto, the processing waste fluid containing processing debris, and for allowing the processing debris to settle for removal of the processing debris from the processing waste fluid. The waste fluid treatment apparatus includes a sedimentation tank that stores the processing waste fluid with the processing debris contained therein, an inflow port provided on the sedimentation tank for introduction of the processing waste fluid into the sedimentation tank, an acidification unit configured to acidify the processing waste fluid to be introduced from the inflow port into the sedimentation tank, whereby the processing debris is allowed to settle at a higher rate compared with a rate at which the processing debris would settle if the processing waste water is neutral, and an outflow port provided on the sedimentation tank for discharge of acidic supernatant that is obtained by allowing the processing debris in the processing waste fluid to settle in the sedimentation tank from the sedimentation tank.

Preferably, the acidification unit may include a carbon dioxide supply unit configured to supply carbon dioxide gas to the processing waste fluid.

Preferably, the waste fluid treatment apparatus may further include a control unit configured to control the waste fluid treatment apparatus, a pH measuring instrument that measures a pH value of the processing waste fluid, a material setting section incorporated in the control unit and configured to set a material of the processing debris, and a correspondence table that is incorporated in the control unit and that presents pH values at which zeta potential is 0 V for a plurality of materials respectively including the material of the processing debris. The control unit may further be configured to control the acidification unit so that the pH value measured by the pH measuring instrument becomes equal to the pH value at which the zeta potential is 0 V for the material of the processing debris as selected from the correspondence table.

In accordance with another aspect of the present invention, there is provided a processing water regeneration system including a waste fluid treatment apparatus for receiving processing waste fluid discharged from a processing machine that processes a workpiece with processing water supplied thereto, the processing waste fluid containing processing debris, and for allowing the processing debris to settle for removal of the processing debris from the processing waste fluid, and a processing water regeneration apparatus for regenerating processing water by removing organic material and inorganic material from acidic supernatant discharged from the waste fluid treatment apparatus and removed of the processing debris. The waste fluid treatment apparatus includes a sedimentation tank that stores the processing waste fluid with the processing debris contained therein, an inflow port provided on the sedimentation tank for introduction of the processing waste fluid into the sedimentation tank, an acidification unit configured to acidify the processing waste fluid to be introduced from the inflow port into the sedimentation tank, whereby the processing debris is allowed to settle at a higher rate compared with a rate at which the processing debris would settle if the processing waste water is neutral, and an outflow port provided on the sedimentation tank for discharge of acidic supernatant that is obtained by allowing the processing debris in the processing waste fluid to settle in the sedimentation tank from the sedimentation tank. The processing water regeneration apparatus includes an ultraviolet ray irradiation unit that radiates an ultraviolet ray to the acidic supernatant to decompose the organic materials and the inorganic materials into organic material ions and inorganic material ions, and an ion exchange resin that removes the organic materials and the inorganic materials contained in the acidic supernatant, and the acidic supernatant that is delivered from the ultraviolet ray irradiation unit and that contains the organic material ions and the inorganic material ions is allowed to flow through the ion exchange resin of the processing water regeneration apparatus to neutralize the acidic supernatant, so that the processing water is regenerated.

Processing debris ($SiO_2$ debris, SiC debris, resin debris, or the like) contained in processing waste fluid is generally charged negative. There is accordingly a problem that pieces of processing debris repel each other, remain dispersed or suspended in a sedimentation tank, and are hard to settle.

On the other hand, the waste fluid treatment apparatus according to the aspect of the present invention includes the acidification unit configured to acidify processing waste fluid to be introduced into the sedimentation tank from the inflow port, whereby a repulsive force produced between pieces of processing debris when the waste fluid is neutral is made smaller and a settling rate of the processing debris is raised. The settling of the processing debris can therefore be accelerated by acidifying the processing waste fluid, thereby enabling reduction of load of the workers for filter replacement and the like in the treatment of waste fluid and also downsizing of the sedimentation tank of the waste fluid treatment apparatus.

If the acidification unit includes the carbon dioxide supply unit configured to supply carbon dioxide gas to the processing waste fluid, the processing waste fluid can be easily changed from neutral to acidic.

If the waste fluid treatment apparatus further includes the control unit configured to control the waste fluid treatment apparatus, the pH measuring instrument that is incorporated in the control unit and measures the pH value of the processing waste fluid, the material setting section incorporated in the control unit and configured to set the material of the processing debris, and the correspondence table that is incorporated in the control unit and that presents pH values at which zeta potential is 0 V for the plurality of materials respectively including the material of the processing debris, the repulsive force between the particles of the processing debris can be eliminated by acidifying the processing waste fluid to conduct a pH adjustment so that the zeta potential is lowered to 0 V. As a result, the pieces of processing debris are brought closer to each other, for example, by a flow of water in the sedimentation tank, and therefore become easier to aggregate together. If the pieces of processing debris come close to each other at a distance of several nm or less, they aggregate together by attraction of van der Walls forces based on the Derjaguin-Landau-Verwey-Overbeek theory (the DLVO theory). Therefore, the processing debris becomes greater and easier to settle. In other words, the processing debris is allowed to settle faster, thereby enabling downsizing of the sedimentation tank of the waste fluid treatment apparatus and also improvement of the processing rate of processing waste fluid.

In the processing water regeneration system including the waste fluid treatment apparatus and the processing water regeneration apparatus for regenerating the processing water by removing organic materials and inorganic materials from the acidic supernatant discharged from the waste fluid treatment apparatus and removed of the processing debris, the processing water regeneration apparatus includes the ultraviolet ray irradiation unit that radiates an ultraviolet ray to the acidic supernatant to decompose the organic materials and the inorganic materials into organic material ions and inorganic material ions, and the ion exchange resin that removes the organic material ions and the inorganic material ions contained in the acidic supernatant. The processing water can therefore be regenerated by allowing the acidic supernatant which has been delivered from the ultraviolet ray irradiation unit and contains the organic material ions and the inorganic material ions, to flow through the ion exchange resin of the processing water regeneration apparatus to neutralize the acidic supernatant.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
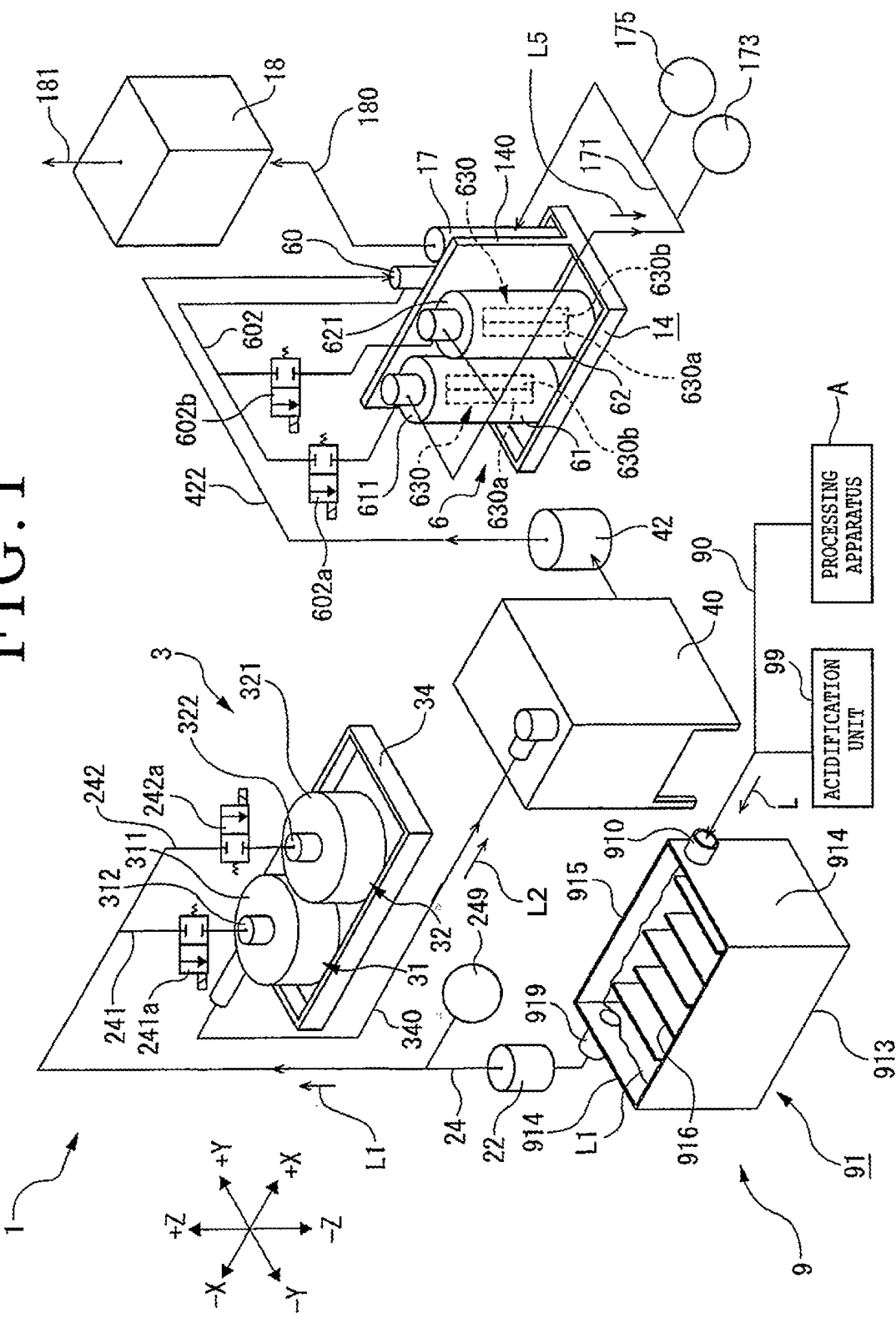
FIG. 1 is a schematic perspective view illustrating an example of a processing water regeneration system.

With reference to the attached drawings, a description will be made in detail about an embodiment of the present invention. A processing machine A illustrated in FIG. 1 is used in a manufacturing process of semiconductor devices, and can be a grinding machine that grinds and thins a workpiece (for example, a silicon wafer, a silicon ingot, or the like) held on a chuck table by a rotating grinding stone while processing water is supplied (for example, pure water), a cutting machine that causes a rotating cutting blade to cut into a workpiece (for example, a silicon wafer or the like) held on a chuck table while processing water is supplied, or the like.

To the processing machine A, a waste fluid treatment apparatus 9 according to the embodiment is connected via a processing waste fluid inflow pipe 90 formed from metal piping, a tube having flexibility, or the like. The waste fluid treatment apparatus 9 receives processing waste fluid L that is discharged from the processing apparatus A and contains processing debris B (for example, $SiO_2$ debris, PSL debris, SiC debris, or the like; see FIG. 2), allows the processing debris B to settle, and hence removes the processing debris B from the processing waste fluid L. The waste fluid treatment apparatus 9 is incorporated in a processing water regeneration system 1 according to the embodiment. In the embodiment, the material of the processing debris B will be assumed to be SiC.

In the embodiment, the processing waste fluid L which flows through the processing waste fluid inflow pipe 90 is introduced into a sedimentation tank 91 of the waste fluid treatment apparatus 9 after being changed from neutral to acidic by an acidification unit 99 that accelerates setting of the processing debris B (raises a rate at which the processing debris B settles).

The waste fluid treatment apparatus 9 includes the sedimentation tank 91, an inflow port 910, the acidification unit 99, and an outflow port 919. The sedimentation tank 91 stores the processing waste fluid L with the processing debris B contained therein. The inflow port 910 is provided on the sedimentation tank 91 and introduces the processing waste fluid L into the sedimentation tank 91. The acidification unit 99 is configured to acidify the processing waste fluid L to be introduced from the inflow port 910 into the sedimentation tank 91, whereby a repulsive force produced between pieces of the processing debris B is made smaller compared with a repulsive force that would be produced if the waste fluid is neutral, and a settling rate of the processing debris B is raised. The outflow port 919 is provided on the sedimentation tank 91 and discharges acidic supernatant L1 obtained by allowing the processing debris B in the processing waste fluid L to settle in the sedimentation tank 91.

Figure 2:
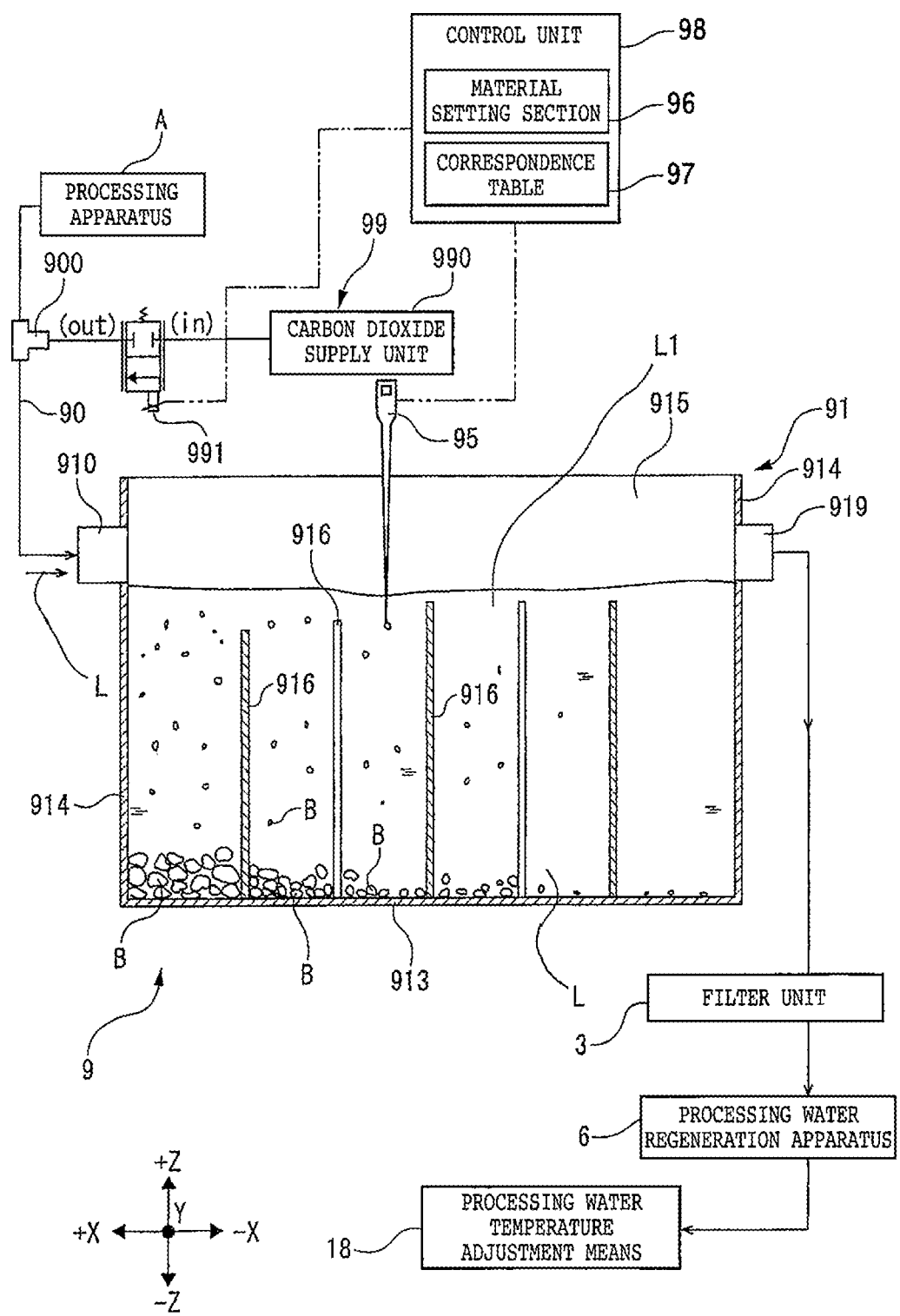
FIG. 2 is a simplified block diagram of the processing water regeneration system of FIG. 1, in which a sedimentation tank in an example of a waste fluid treatment apparatus is illustrated in cross-section.

The sedimentation tank 91 in the embodiment is a vessel which is open on an upper side thereof and has a substantially parallelepiped shape in the example illustrated in the FIG, and includes a bottom wall 913 having a substantially rectangular shape as seen in plan and four side walls integrally extending upward in a +Z direction from an outer periphery of the bottom wall 913. In FIGS. 1 and 2, two of the side walls, the two side walls opposing each other in an X-axis direction, are assumed to be side walls 914, while the remaining two side walls opposing each other in a Y-axis direction are assumed to be side walls 915.

In an upper part of the sedimentation tank 91, an unillustrated overflow pipe is disposed to prevent an overflow of the processing waste fluid L. The overflow pipe is communicated to an unillustrated tank, and leads the processing waste fluid L, which would otherwise overflow from the sedimentation tank 91, to the tank. The sedimentation tank 91 may include a detachable lid.

In the example illustrated in FIGS. 1 and 2, the inflow port 910 is formed through the side wall 914 on a side in a +X direction, while the outflow port 919 is formed through the side wall 914 on a side in a −X direction.

In the sedimentation tank 91, a plurality of baffles 916 is disposed side by side in the X-axis direction and extending vertically upright from the bottom wall 913. Each baffle 916 intersects the X-axis direction, which runs from the inflow port 910 toward the outflow port 919, in a horizontal direction (in other words, is disposed extending also in the Y-axis direction that intersects the X-axis direction). The baffles 916 are set at upper ends thereof lower than upper ends of the side walls 914. Whenever the processing waste fluid L introduced from the inflow port 910 overflows the baffles 916 sequentially while flowing toward the outflow port 919, the processing debris B settles gradually. The baffles 916 may be set to have an equal height or may be set to become sequentially higher toward the side in the +X direction. Further, a flow channel as viewed from above may be formed in the sedimentation tank 91 by the baffles 916.

In the embodiment, the acidification unit 99 includes, as illustrated in FIG. 2, a carbon dioxide supply unit 990 that supplies carbon dioxide gas to the processing waste fluid L.

For example, the carbon dioxide supply unit 990 with carbon dioxide gas stored therein is communicated to an intermediate portion of the processing waste fluid inflow pipe 90 via a three-way pipe connector 900 or the like. Carbon dioxide gas delivered from the carbon dioxide supply unit 990 is supplied to the processing waste fluid L that is flowing through the processing waste fluid inflow pipe 90 toward the waste fluid treatment apparatus 9. As an alternative, the carbon dioxide supply unit 990 may supply carbon dioxide gas to the processing waste fluid L in the sedimentation tank 91.

For example, the carbon dioxide supply unit 990 can adjust the carbon dioxide gas supply rate per unit volume of the processing waste fluid L, for example, by a control valve 991 as illustrated in FIG. 2. The control valve 991 is, for example, a proportional control solenoid valve, and can freely perform adjustment of the supply rate, in other words, the flow rate of carbon dioxide gas which the carbon dioxide supply unit 990 supplies to the processing waste fluid L, between 0% to 100% by changing the quantity of a current that a below-described control unit 98 applies to the control valve 991. The control valve 991 may also be a flow rate control valve such as, a variable orifice valve or a butterfly valve, for example.

As illustrated in FIG. 2, the waste fluid treatment apparatus 9 in the embodiment includes a pH measuring instrument 95, a material setting section 96, a correspondence table 97, and the control unit 98. The pH measuring instrument 95 measures the pH value of the processing waste fluid L. The material setting section 96 sets the material of the processing debris B. The correspondence table 97 presents pH values at which zeta potential is 0 V for a plurality of materials respectively including the material of the processing debris B. The control unit 98 controls the acidification unit 99 so that the pH value measured by the pH measuring instrument 95 becomes equal to the pH value at which the zeta potential is 0 V for the material selected from the correspondence table 97. The term "zeta potential" is defined to be an electrical potential at a slipping plane in an electrical double layer formed around a particle of the processing debris B when the electrical potential in an electrically neutral region sufficiently distant from the particle of the processing debris B is assumed to be 0 V and a measurement is made using this zero point as a reference.

In the example illustrated in FIG. 2, the pH measuring instrument 95 is arranged to measure the pH value of the processing waste fluid L in the sedimentation tank 91 of the waste fluid treatment apparatus 9, but may also be arranged to enable measurement of the pH value of the processing waste fluid L that is flowing in the processing waste fluid inflow pipe 90 on a downstream side of the three-way pipe connector 900 and contains carbon dioxide gas mixed therein.

The control unit 98 is configured from a central processing unit (CPU) that performs processing in accordance with a control program, a storage device such as a memory, and the like, and is electrically connected to the pH measuring instrument 95, the control valve 991, and the like, via unillustrated, wired or wireless communication paths.

Figure 3:
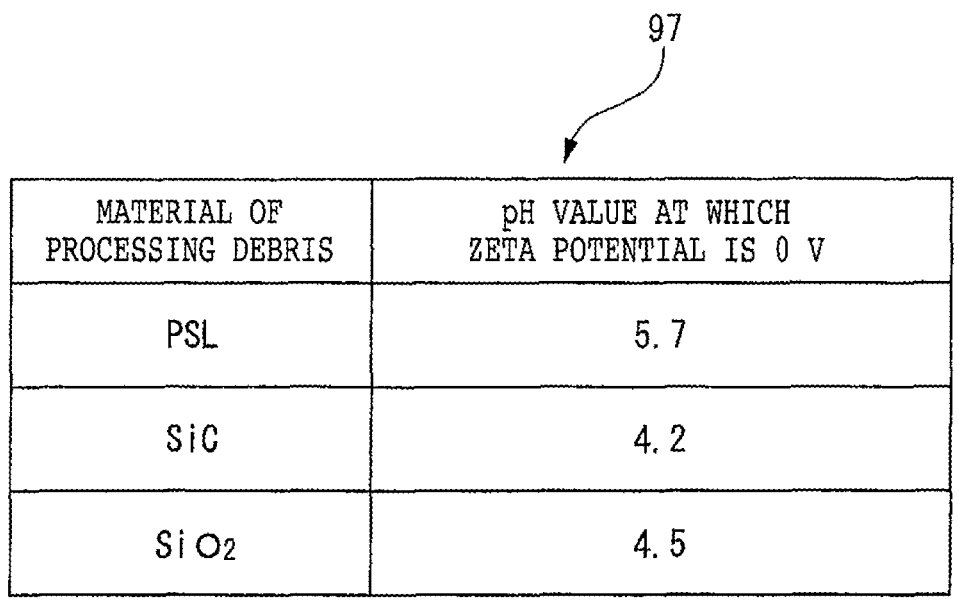
FIG. 3 is a correspondence table that presents pH values at which zeta potential is 0 V for a plurality of materials respectively.
Figure 4:
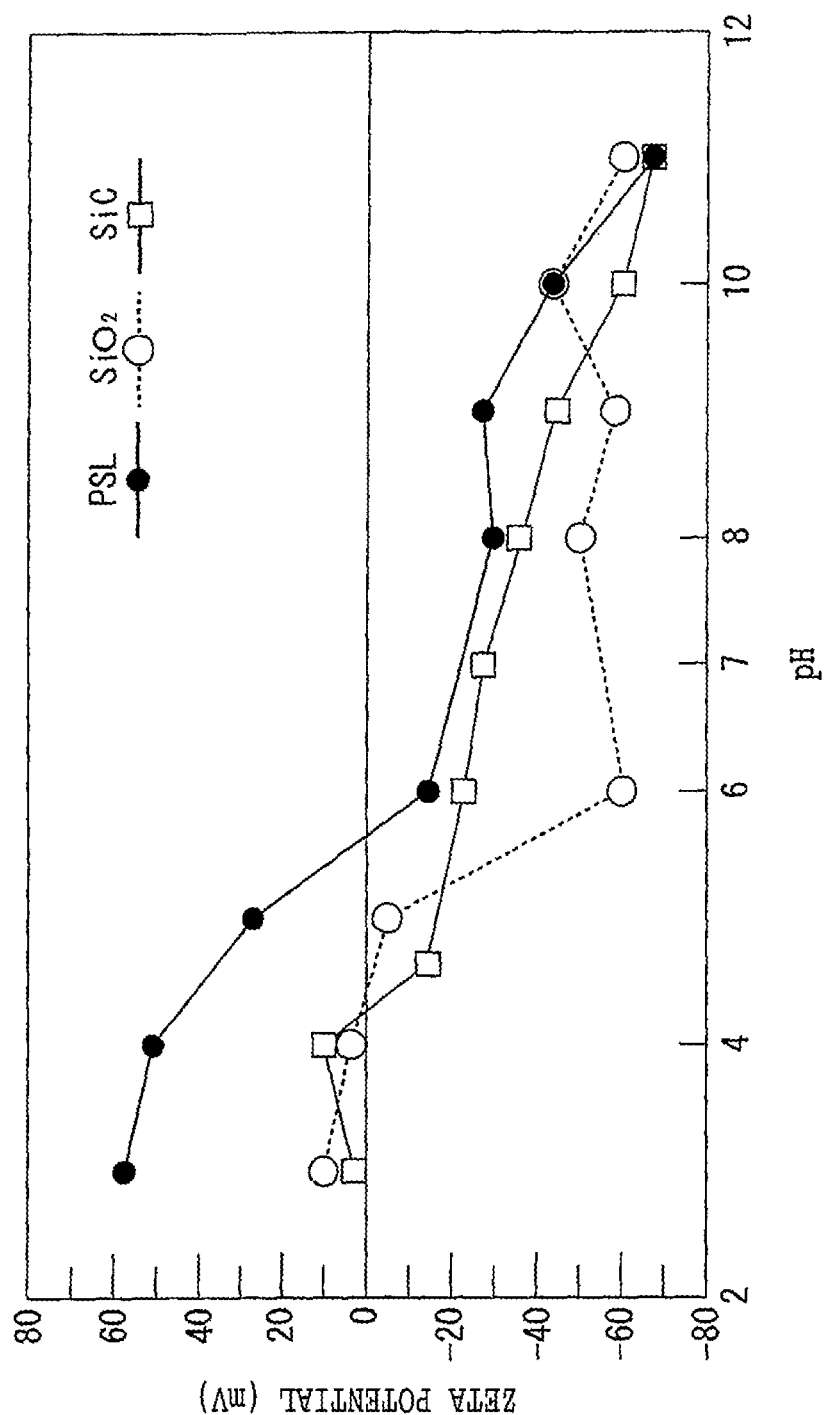
FIG. 4 is a graph illustrating pH value dependence of zeta potentials of polystyrene latex (PSL) particle surfaces, $SiO_2$ surfaces, and SiC surfaces as processing debris.

In the embodiment, the material setting section 96 and the correspondence table 97 are incorporated in the control unit 98. The material setting section 96 is set in an area of the storage device of the control unit 98. On the other hand, the correspondence table 97 is stored as data, for example, in another area of the storage device of the control unit 98. The correspondence table 97 illustrated in detail in FIG. 3 is an extract of pH values, at which zeta potential is 0 V, from a graph illustrated in FIG. 4 and successfully obtained from past experimental results that demonstrate pH value dependence of zeta potentials of polystyrene latex (PSL) particle surfaces, $SiO_2$ particle surfaces, and SiC surfaces.

A description will hereinafter be made about a case in which using the waste fluid treatment apparatus 9, the processing waste fluid L discharged from the processing machine A, which processes workpieces while supplying processing water to the workpieces, and containing the processing debris B is received, and the processing debris B is then allowed to settle, thereby removing the processing debris B from the processing waste fluid L.

First, the processing waste fluid L which has been discharged from the processing machine A illustrated in FIGS. 1 and 2 and contains the processing debris B, organic materials, and inorganic materials flows through the processing waste fluid inflow pipe 90 into the sedimentation tank 91 of the waste fluid treatment apparatus 9 from the inflow port 910, is progressively stored in the sedimentation tank 91, and also flows through the zigzag flow channel formed by the baffles 916 in the sedimentation tank 91.

As illustrated in FIG. 2, the processing debris B contained in the processing waste fluid L is allowed to gradually and progressively settle in the sedimentation tank 91. As also illustrated in FIG. 2, the sedimentation volume of the processing debris B is the greatest on a side of the inflow port 910 located on a side in the +X direction, and is the least on a side of the outflow port 919 located on a side in the −X direction. As a result of the settling of the processing debris B in the sedimentation tank 91, the acidic supernatant L1 is obtained, and is then discharged from the outflow port 919.

In the waste fluid treatment apparatus 9 according to the embodiment, to accelerate the sedimentation of the processing debris B, a worker, for example, inputs the material (SiC in the embodiment) of the processing debris B which is contained in the processing waste fluid L continuously discharged from the processing machine A, through unillustrated input means (a touch panel, keyboard, or the like) attached to the waste fluid treatment apparatus 9, whereby the material is set (stored) in the material setting section 96. As an alternative, the waste fluid treatment apparatus 9 may be configured, for example, to transmit information regarding the material of the processing debris B from the processing machine A to the control unit 98 and to further set (store) the material to the material setting section 96 from the control unit 98.

Under the control by the control unit 98 illustrated in FIG. 2, a current is then applied to the control valve 991 so that the control valve 991 is opened. As a result, carbon dioxide gas, specifically compressed carbon dioxide gas, is delivered from the carbon dioxide supply unit 990 and is allowed to dissolve into the processing waste fluid L inside the processing waste fluid inflow pipe 90. As a result, the neutral processing waste fluid L is acidified while flowing toward the sedimentation tank 91 through the processing waste fluid inflow pipe 90.

In the embodiment, the pH value of the processing waste fluid L in the sedimentation tank 91 is measured by the pH measuring instrument 95, and information regarding the pH value measured is transmitted to the control unit 98. The control unit 98 selects a pH value (=4.2) at which zeta potential is 0 V for the material (SiC) of the processing debris B, from the correspondence table 97 stored beforehand in the control unit 98 and illustrated in FIG. 3. The control unit 98 then adjusts the value of a current to be applied to the control valve 991, thereby adjusting the opening of the control valve 991 to set the supply rate of carbon dioxide which the carbon dioxide supply unit 990 supplies to the processing waste fluid L, at a desired supply rate. As a result, the pH value of the processing waste fluid L in the sedimentation tank 91 drops, for example, to 4.2.

In the manner as described above, the zeta potential comes close to 0 V so that the repulsive force between the particles of the processing debris B is eliminated. As a result, the pieces of the processing debris B are brought closer to each other, for example, by a flow of water in the sedimentation tank 91, and therefore become easier to aggregate together. For example, if the pieces of processing debris B come close to each other at a distance of several nm or less, they aggregate together by attraction of van der Walls forces based on the DLVO theory. Therefore, the processing debris B becomes greater and easier to settle. In other words, the processing debris B is allowed to settle faster, thereby enabling to downsize the sedimentation tank 91 of the waste fluid treatment apparatus 9 and also to improve the processing rate of processing waste fluid L, in other words, increase of the inflow rate of the processing waste fluid L into the waste fluid treatment apparatus 9 compared with conventional inflow rates.

In the embodiment, the acidification unit 99 includes the carbon dioxide supply unit 990 to supply carbon dioxide gas to the processing waste fluid L, thereby enabling to easy change of the processing waste fluid L from neutral to acidic. However, the acidification unit 99 is not limited to its configuration in the embodiment. For example, the acidification unit 99 may be configured to supply acetic acid or citric acid to the sedimentation tank 91 or the processing waste fluid inflow pipe 90.

The processing water regeneration system 1 of the embodiment as illustrated in FIGS. 1 and 2 includes the waste fluid treatment apparatus 9 already described above and a processing water regeneration apparatus 6 that regenerates processing water L5 by removing organic materials (organic material ions) and inorganic materials (inorganic material ions) from the acidic supernatant L1 discharged from the waste fluid treatment apparatus 9 and removed of the processing debris B (see FIG. 2).

In the processing water regeneration system 1 of the embodiment, a supernatant pump-up pump 22 connected to the waste fluid treatment apparatus 9 as illustrated in FIG. 1 pumps up the acidic supernatant L1 which has been discharged from the outflow port 919 of the waste fluid treatment apparatus 9, by a negative pressure produced by itself, and delivers it to an introduction pipe 24 connected at an end thereof to the supernatant pump-up pump 22 and at an opposite end thereof to a filter unit 3.

A pressure meter 249 is arranged, for example, in the introduction pipe 24. It is hence possible to monitor by the pressure meter 249 for any delivery rate of the acidic supernatant L1 by the supernatant pump-up pump 22 greater than the treatment capacity of the filter unit 3.

The processing water regeneration system 1 may not include the filter unit 3, and the acidic supernatant L1 discharged from the waste fluid treatment apparatus 9 and pumped up by the supernatant pump-up pump 22 may be introduced as it is into a clear water tank 40 illustrated in FIG. 1.

The filter unit 3 further removes fine processing debris and the like that may still remain in the acidic supernatant L1 pumped up by the supernatant pump-up pump 22, whereby the acidic supernatant L1 is purified into clearer acidic supernatant (hereinafter called "clear water L2"). In the embodiment, the filter unit 3 is configured, for example, of "CC FILTER UNIT" (trade name; manufactured by DISCO Corporation). The filter unit 3 includes, for example, a cylindrical first filter 31 and a cylindrical second filter 32, and the acidic supernatant L1 is introduced from the introduction pipe 24 to the first filter 31 or the second filter 32.

The first filter 31 includes, for example, a cylindrical housing 311 having a plurality of unillustrated openings in a side wall thereof, an input port 312 centrally formed in a top wall of the cylindrical housing 311 for use in charging the acidic supernatant L1, and an unillustrated cylindrical filter paper disposed in the cylindrical housing 311. In the first filter 31, the acidic supernatant L1 introduced into the cylindrical filter paper from the input port 312 is filtered through the cylindrical filter paper, the fine processing debris B is removed further, and the resulting acidic supernatant L1 is then discharged as clear water L2 to an outside through the openings in the side wall of the cylindrical housing 311.

Similarly, the second filter 32 includes, for example, a cylindrical housing 321 having a plurality of unillustrated openings in a side wall thereof, an input port 322 centrally formed in a top wall of the cylindrical housing 321 for use in charging the acidic supernatant L1, and an unillustrated cylindrical filter paper disposed in the cylindrical housing 321. In the second filter 32, the acidic supernatant L1 introduced into the cylindrical filter paper from the input port 322 is filtered through the cylindrical filter paper, the fine processing debris B is removed further, and the resulting acidic supernatant L1 is then discharged as clear water L2 to an outside through the openings in the side wall of the cylindrical housing 321.

The first filter 31 and the second filter 32 configured as described above are disposed side by side on a pan-shaped tray 34. The clear water L2 is discharged from the first filter 31 or the second filter 32 onto the tray 34. A piping 340 is communicated on an upstream side thereof to the tray 34 and is communicated on a downstream side thereof to the clear water tank 40.

The introduction pipe 24 is branched on another side into a first introduction branch pipe 241 and a second introduction branch pipe 242. The first introduction branch pipe 241 is communicated to the input port 312 of the first filter 31, and the second introduction branch pipe 242 is communicated to the input port 322 of the second filter 32.

A first solenoid valve 241a is disposed in the first introduction branch pipe 241, and a second solenoid valve 242a is disposed in the second introduction branch pipe 242. The first solenoid valve 241a switches the first introduction branch pipe 241 between a state in which it is communicated to the first filter 31 and a state in which it is not communicated to the first filter 31. Similarly, the second solenoid valve 242a switches the second introduction branch pipe 242 between a state in which it is communicated to the second filter 32 and a state in which it is not communicated to the second filter 32.

For example, if the treatment of the acidic supernatant L1 is continuously performed through the first filter 31 alone, the processing debris B deposits on an inner side of the unillustrated filter paper of the first filer 31, it becomes difficult for the acidic supernatant L1 to pass through the unillustrated filter paper, and therefore the filtering function is lost. As a result, the pressure meter 249 measures a pressure that has risen beyond a tolerance due to an increase in pressure inside the introduction pipe 24. Control is performed by the control unit 98 to bring the first solenoid valve 241a into a closed state, so that the communication between the first introduction branch pipe 241 and the first filter 31 is cut off. Further control is performed by the control unit 98 to bring the second solenoid valve 242a into an open state, so that the second introduction branch pipe 242 and the second filter 32 are communicated together. If the pressure meter 249 measures a pressure that has risen beyond the tolerance due to an increase in pressure inside the introduction pipe 24, the control unit 98 controls unillustrated alarm means to trigger an alarm and also to present a display, thereby notifying the worker that a need has risen to replace the first filter 31.

As a result, the acidic supernatant L1 delivered by the supernatant pump-up pump 22 flows into the second filter 32 and is treated by the second filter 32 in a similar manner as that by the first filter 31. As the first filter 31 is now ready for replacement of the filter paper or the like, the worker can perform replacement of filter paper for the first filter 31. It is therefore unnecessary to stop the waste fluid treatment apparatus 9 in the processing water regeneration system 1 because the treatment of the acidic supernatant L1 can still be performed by the second filter 32 when the filter paper or the like of the first filter 31 is replaced.

The processing water regeneration apparatus 6 illustrated in FIG. 1 includes an ultraviolet ray irradiation unit 60 and an ion exchange resin 630. The ultraviolet ray irradiation unit 60 radiates an ultraviolet ray to the acidic supernatant in which the processing debris B has been removed to a still higher level by the filter unit 3 (specifically, the clear water L2 in the embodiment). The ion exchange resin 630 removes organic material ions and inorganic material ions contained in the clear water L2.

The clear water L2 flows down from the tray 34 via the piping 340 and is temporally stored in the clear water tank 40. Then, the clear water L2 is pumped up by a clear water pump 42 illustrated in FIG. 1, flows through an introduction pipe 422 connected at an end thereof to the clear water pump 42 and at an opposite end thereof to the ultraviolet irradiation unit 60, and is delivered to the ultraviolet irradiation unit 60.

The ultraviolet irradiation unit 60 is detachably disposed, for example, on a support base 14 illustrated in FIG. 1. A partition board 140 is disposed upright on the support base 14, and the ultraviolet irradiation unit 60 is located behind (on a side in a +Y direction of) the partition board 140 on the support base 14. Further, a microfilter 17 is detachably disposed adjacent to the ultraviolet irradiation unit 60 behind (on the side in the +Y direction of) the partition board 140 on the support base 14.

The ultraviolet irradiation unit 60 radiates an ultraviolet ray of a predetermined wavelength from an unillustrated ultraviolet lamp to the clear water L2 passing, for example, through the ultraviolet irradiation unit 60, and decomposes (ionizes) organic materials and inorganic materials in the clear water L2.

In the embodiment, the ion exchange resin 630 is incorporated, for example, in first ion exchange means 61 and second ion exchange means 62. The first ion exchange means 61 and the second ion exchange means 62 are detachably disposed side by side on a front side (on a side in a −Y direction) of the partition board 140 on the support base 14.

In the embodiment, an anion exchange resin 630a and a cation exchange resin 630b are used in combination as the ion exchange resin 630, and are packed at a predetermined ratio in a casing 611 of the first ion exchange means 61 and a casing 621 of the second ion exchange means 62, respectively.

After the organic materials and the inorganic materials are decomposed into organic material ions and inorganic material ions in the ultraviolet ray irradiation unit 60, the acidic clear water L2 with the organic material ions and the inorganic material ions contained therein is introduced into the first ion exchange means 61 or the second ion exchange means 62 via a piping 602.

In the piping 602, a solenoid on-off valve 602a and a solenoid on-off valve 602b are disposed. If the solenoid on-off valve 602a is brought into an open state, the clear water L2 is introduced into the first ion exchange means 61. If the solenoid on-off valve 602b is brought into an open state, on the other hand, the clear water L2 is introduced into the second ion exchange means 62.

While passing through the ion exchange resin 630 of the first ion exchange means 61 or the ion exchange resin 630 of the second ion exchange means 62, the organic material ions and inorganic material ions are removed from the acidic clear water L2, and at the same time, carbon dioxide gas contained in the acidic clear water L2 is adsorbed on the anion exchange resin 630a. As a result, the acidic clear water L2 is purified to the neutral processing water L5.

In the neutral processing water L5 purified by the removal of the ions from the acidic clear water L2 as described above, what may still be mixed are fine materials including resin debris of the ion exchange resin 630 that make up the first ion exchange means 61 and the second ion exchange means 62. Therefore, the processing water L5 delivered from the first ion exchange means 61 and the second ion exchange means 62 is introduced into the microfilter 17 via a piping 171, and the fine materials such as the resin debris of the ion exchange resin 630 which is still mixed in the processing water L5 are captured by the microfilter 17.

Pressure detection means 173 is disposed, for example, in the piping 171 to detect the pressure of the processing water L5 that is being delivered from the first ion exchange means 61 and the second ion exchange means 62 to the microfilter 17. If the pressure in the piping 171 as detected by the pressure detection means 173 has reached a predetermined pressure value or higher, the control unit 98 determines that fine materials such as resin debris have deposited on the microfilter 17 and the microfilter 17 has lost its filtering function, and controls the unillustrated alarm means to trigger an alarm and also to present a display, thereby notifying that the microfilter 17 should be replaced.

A resistivity meter 175 may also be disposed in the piping 171 to detect the specific resistance of the processing water L5 that is being delivered from the first ion exchange means 61 or the second ion exchange means 62 to the microfilter 17.

After passage through the microfilter 17, the processing water L5 is delivered to processing water temperature adjustment means 18 via a piping 180. The processing water L5 which has been delivered to the processing water temperature adjustment means 18 is adjusted to a predetermined temperature there, and is circulated via a piping 181 to unillustrated processing water supply means in the processing machine A illustrated in FIG. 1.

As described above, the processing water regeneration system 1 includes the waste fluid treatment apparatus 9 and the processing water regeneration apparatus 6. The processing water regeneration apparatus 6 regenerates the processing water by removing organic materials (organic material ions) and inorganic materials (inorganic material ions) from the acidic supernatant (in the present embodiment, the clear water L2) discharged from the waste fluid treatment apparatus 9 and removed of the processing debris B. In the processing water regeneration system 1, the processing water regeneration apparatus 6 further includes the ultraviolet ray irradiation unit 60 that radiates an ultraviolet ray to the clear water L2 and the ion exchange resin 630 that removes organic material ions and inorganic material ions contained in the clear water L2. The processing waste fluid L is acidified by the acidification unit 99 of the waste fluid treatment apparatus 9, and the processing debris B is allowed to settle out. The resulting acidic clear water L2 is allowed to pass through the ion exchange resin 630 of the processing water regeneration apparatus 6, whereby the clear water L2 is neutralized to regenerate the processing water L5. The regenerated processing water L5 can then be supplied to the processing machine A again.

The waste fluid treatment apparatus 9 and processing water regeneration system 1 according to the present invention are not limited to the embodiment, and may obviously be practiced in a variety of different modes within the scope of the technical concept of the present invention. Further, the shapes and the like of the individual elements of the waste fluid treatment apparatus 9 and the processing water regeneration system 1 illustrated in the attached drawings are not limited thereto, and can be changed as desired within a scope in which the advantageous effects of the present invention can be obtained.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A waste fluid treatment apparatus for receiving processing waste fluid discharged from a processing machine that processes a workpiece with processing water supplied thereto, the processing waste fluid containing processing debris, and for allowing the processing debris to settle for removal of the processing debris from the processing waste fluid, comprising:
   a sedimentation tank that stores the processing waste fluid with the processing debris contained therein;
   an inflow port provided on the sedimentation tank for introduction of the processing waste fluid into the sedimentation tank;
   an acidification unit configured to acidify the processing waste fluid to be introduced from the inflow port into the sedimentation tank;
   an outflow port provided on the sedimentation tank for discharge of acidic supernatant obtained when the processing debris in the processing waste fluid settles in the sedimentation tank;
   a plurality of baffles provided within the sedimentation tank, wherein the plurality of baffles each extend in the upright direction and are spaced from each other with respect to a direction that extends between the inflow port and the outflow port, and further wherein the baffles sequentially increase in height when considered in the direction that extends between the inflow port and the outflow port;
   a control unit configured to control the waste fluid treatment apparatus;
   a pH measuring instrument that measures a pH value of the processing waste fluid;
   a material setting section incorporated in the control unit and configured to receive an input to set a material of the processing debris; and
   a correspondence table that is incorporated in the control unit and that presents pH values at which zeta potential is 0 V for a plurality of materials respectively including the material of the processing debris,
   wherein the control unit is further configured to control the acidification unit so that the pH value measured by the pH measuring instrument becomes equal to the pH value at which the zeta potential is 0 V for the material of the processing debris from the correspondence table that corresponds to the material input into the material setting section.

2. The waste fluid treatment apparatus according to claim 1, wherein the acidification unit includes a carbon dioxide supply unit configured to supply carbon dioxide gas to the processing waste fluid.

3. The waste fluid treatment apparatus according to claim 1, wherein the plurality of materials in the correspondence table includes polystyrene latex, silicon carbide, and silicon dioxide.

4. The waste fluid treatment apparatus according to claim 1, wherein the plurality of materials in the correspondence table includes polystyrene latex.

5. The waste fluid treatment apparatus according to claim 1, wherein the plurality of materials in the correspondence table includes silicon carbide.

6. The waste fluid treatment apparatus according to claim 1, wherein the plurality of materials in the correspondence table includes silicon dioxide.

7. A processing water regeneration system comprising:
a waste fluid treatment apparatus for receiving processing waste fluid discharged from a processing machine that processes a workpiece with processing water supplied thereto, the processing waste fluid containing processing debris, and for allowing the processing debris to settle for removal of the processing debris from the processing waste fluid, the waste fluid treatment apparatus including:
a sedimentation tank that stores the processing waste fluid with the processing debris contained therein,
an inflow port provided on the sedimentation tank for introduction of the processing waste fluid into the sedimentation tank,
an acidification unit configured to acidify the processing waste fluid to be introduced from the inflow port into the sedimentation tank,
an outflow port provided on the sedimentation tank for discharge of acidic supernatant obtained when the processing debris in the processing waste fluid settles in the sedimentation tank,
a plurality of baffles provided within the sedimentation tank, wherein the plurality of baffles each extend in the upright direction and are spaced from each other with respect to a direction that extends between the inflow port and the outflow port, and further wherein the baffles sequentially increase in height when considered in the direction that extends between the inflow port and the outflow port,
a control unit configured to control the waste fluid treatment apparatus,
a pH measuring instrument that measures a pH value of the processing waste fluid,
a material setting section incorporated in the control unit and configured to receive an input to set a material of the processing debris,
a correspondence table that is incorporated in the control unit and that presents pH values at which zeta potential is 0 V for a plurality of materials respectively including the material of the processing debris,
wherein the control unit is further configured to control the acidification unit so that the pH value measured by the pH measuring instrument becomes equal to the pH value at which the zeta potential is 0 V for the material of the processing debris from the correspondence table that corresponds to the material input into the material setting section,
a processing water regeneration apparatus for regenerating processing water by removing organic materials and inorganic materials from acidic supernatant discharged from the waste fluid treatment apparatus and removed of the processing debris, the processing water regeneration apparatus including:
an ultraviolet ray irradiation unit that radiates an ultraviolet ray to the acidic supernatant to decompose the organic materials and the inorganic materials into organic material ions and inorganic material ions, and
an ion exchange resin that removes the organic material ions and the inorganic materials ions contained in the acidic supernatant, and
wherein the acidic supernatant delivered from the ultraviolet ray irradiation unit and that contains the organic material ions and the inorganic material ions flows through the ion exchange resin of the processing water regeneration apparatus to neutralize the acidic supernatant, so that the processing water is regenerated.

8. The processing water regeneration system according to claim 7, wherein the acidification unit of the waste fluid treatment apparatus includes a carbon dioxide supply unit configured to supply carbon dioxide gas to the processing waste fluid.

9. The processing water regeneration system according to claim 7, wherein the plurality of materials in the correspondence table includes polystyrene latex, silicon carbide, and silicon dioxide.

10. The processing water regeneration system according to claim 7, wherein the plurality of materials in the correspondence table includes polystyrene latex.

11. The processing water regeneration system according to claim 7, wherein the plurality of materials in the correspondence table includes silicon carbide.

12. The processing water regeneration system according to claim 7, wherein the plurality of materials in the correspondence table includes silicon dioxide.

* * * * *